(12) United States Patent
Maguire

(10) Patent No.: US 6,241,076 B1
(45) Date of Patent: Jun. 5, 2001

(54) CONTROL APPARATUS FOR CONVEYOR OF PARTICULATE MATERIAL

(76) Inventor: Dennis Maguire, 6012 Adare Drive, R.R. 1, Lucan, Ontario (CA), N0M 2J0

( * ) Notice: Subject to any disclaimer, the term of this patent is extended or adjusted under 35 U.S.C. 154(b) by 0 days.

(21) Appl. No.: 09/210,745

(22) Filed: Dec. 15, 1998

(51) Int. Cl.⁷ .......................... B65G 15/12; B65G 15/14; B65G 15/20
(52) U.S. Cl. .................................... 198/626.1; 196/626.2; 196/626.4
(58) Field of Search .................... 198/626.1, 626.5, 198/626.3, 626.2, 626.4, 626.6, 638, 640; 414/248, 251

(56) References Cited

U.S. PATENT DOCUMENTS

| | | | |
|---|---|---|---|
| 3,581,874 | * 6/1971 | Keith ..................... | 198/317 |
| 3,881,653 | * 5/1975 | Birckhead ............... | 239/698 |
| 3,910,405 | 10/1975 | Couperus et al. . | |
| 3,917,236 | * 11/1975 | Hanson ................... | 366/9 |
| 4,072,435 | * 2/1978 | Coho et al. ............. | 404/110 |
| 4,077,510 | * 3/1978 | Muller ..................... | 198/840 |
| 4,457,422 | 7/1984 | Hurd . | |
| 4,776,451 | 10/1988 | Gaddis . | |
| 4,923,359 | 5/1990 | Petri et al. . | |
| 5,017,969 | * 5/1991 | Mitomi et al. .......... | 399/299 |
| 5,039,412 | * 8/1991 | Marsh ..................... | 210/401 |
| 5,044,240 | * 9/1991 | Fischer et al. .......... | 83/161 |
| 5,190,432 | 3/1993 | Gerow . | |
| 5,458,051 | * 10/1995 | Alden et al. ............ | 99/349 |
| 5,492,216 | * 2/1996 | McCoy et al. .......... | 198/625.5 |
| 5,755,073 | * 5/1998 | Moncreif et al. ....... | 53/48.1 |
| 5,996,769 | * 12/1999 | Winchip ................. | 198/626.4 |

\* cited by examiner

Primary Examiner—Christopher P. Ellis
Assistant Examiner—Kenneth W Bower
(74) Attorney, Agent, or Firm—Santosh K. Chari; Orange & Chari

(57) ABSTRACT

A device for controlling the conveyance of particulate material on a conveyor belt comprises a frame with an endless belt attached thereto. The apparatus is positioned above the conveyor belt and in frictional contact therewith whereby the motion of the conveyor results in motion of the endless belt on the apparatus. The particulate material thereby is passes between the endless belt and the conveyor belt and any bouncing movement of such material is prevented. Use of the present invention on conventional conveyor belts controls the dispersion of the particulate material carried thereon and allows for the speed of the conveyor to be increased. The present invention is suitable for use with a conveyor apparatus used with a truck and commonly known as a "stone slinger".

7 Claims, 3 Drawing Sheets

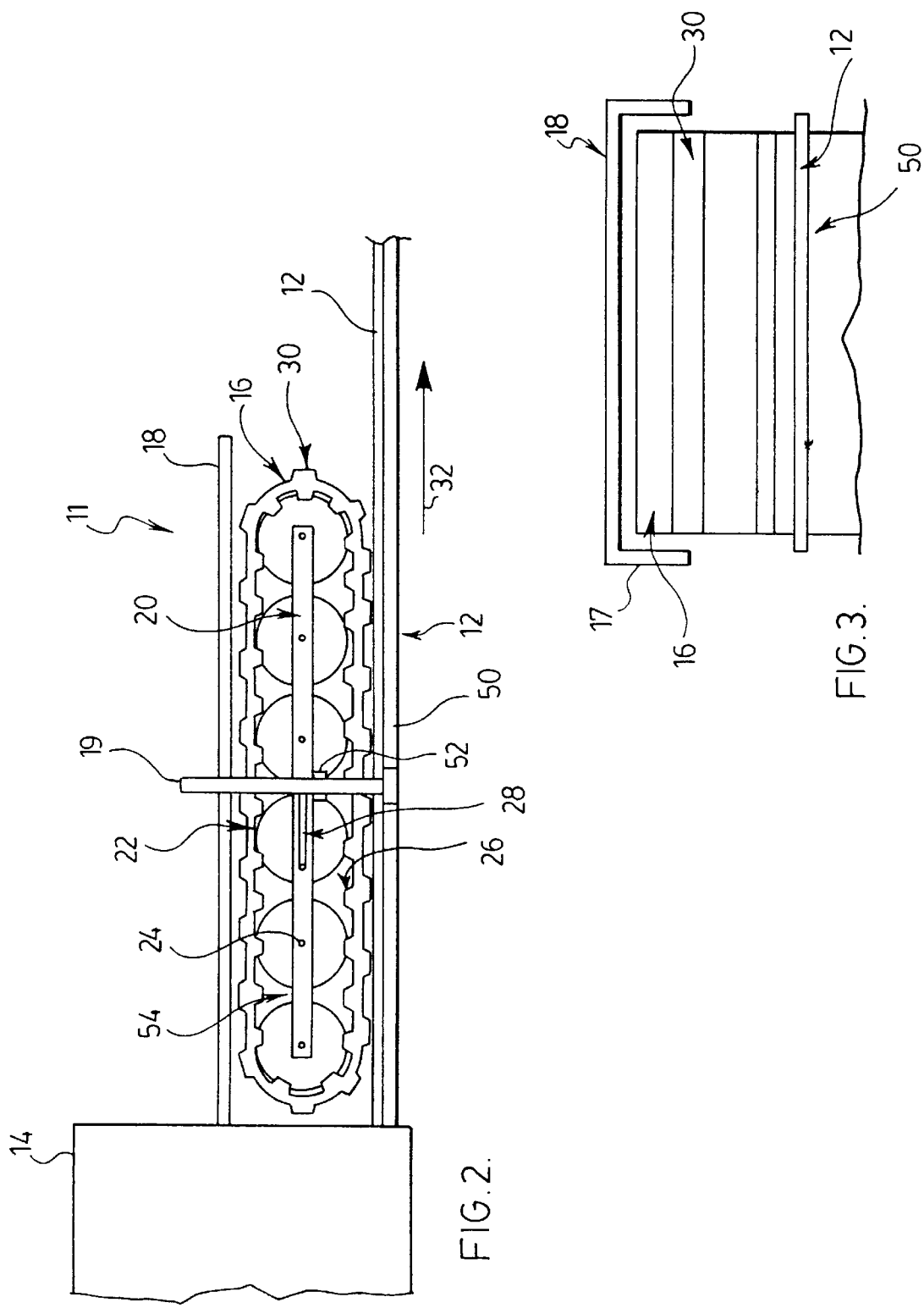

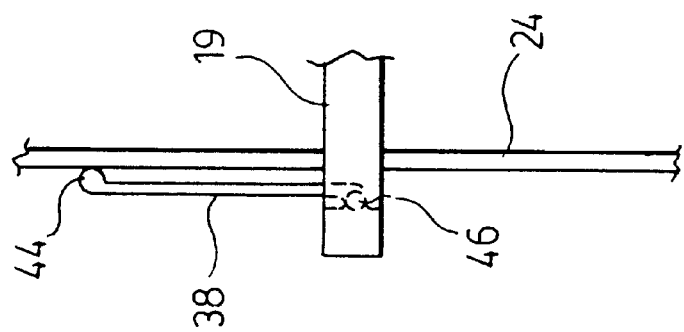
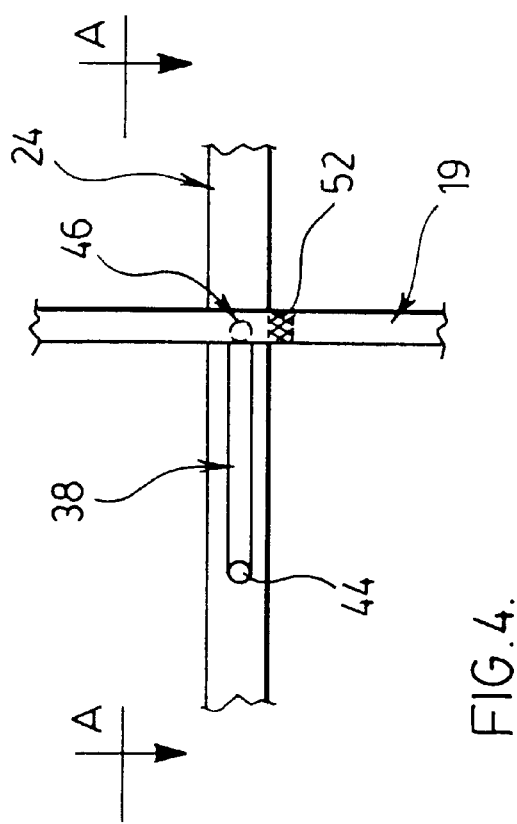

CONTROL APPARATUS FOR CONVEYOR OF PARTICULATE MATERIAL

FIELD OF THE INVENTION

The present invention relates to a device which attaches to a conveyor belt and which controls the conveyance of particulate matter along such belt.

BACKGROUND OF THE INVENTION

Conveyors for moving particulate material such as stone, sand or gravel can be found in various applications. A truck with a conveyor apparatus as known in the art is disclosed in U.S. Pat. No. 5,190,432. This patent discloses an optional attachment for a standard dump truck that includes a swing arm, pivotally connected to the truck's chassis, an elongated frame pivotally connected to the swing arm and mounting an endless conveyor belt.

Another application where conveyors are used to move particulate material is a stone slinger. A stone slinger includes a first conveyor that receives material from a hopper, which is located behind the cab of a truck. The first conveyor moves the material onto a second conveyor. The second conveyor then sprays the material from the back end of the truck.

Stone slingers are used so that the particulate material can be projected from the rear of a dump truck or similar device to a desired location. The slinger has a limited dispensing range that is determined by the speed of the conveyor.

Material is usually dumped onto the conveyor from a hopper or another conveyor. The method in which the material is loaded onto the conveyor from the truck causes it to bounce along the conveyor rather than rest on it. This can cause some material to be projected from the conveyor prematurely in all directions. This creates a hazard to anyone standing in the vicinity of the slinger. An increase in the conveyor speed causes further erratic discharge of material. Therefore, the speed of the conveyor is limited thereby limiting the discharge range of the slinger.

Some attempts have been made to control the premature and erratic discharge of material from the conveyor. In one such method, the material is sandwiched between the conveyor belt and a cover that is made of relatively light material such as sheet metal. The cover lies flat on the belt, while maintaining its horizontal position, and is temporarily displaced as the material passes underneath it. This method does not effectively control the erratic and premature discharge of material.

Thus, a need exists for a device for controlling the erratic dispersion of particulate material being conveyed on a conveyor belt. Such a device would reduce any impediment in increasing the speed of the conveyor belt and, thereby, allow material to be ejected farther.

SUMMARY OF THE INVENTION

In general terms, the present invention provides, in one embodiment, an apparatus for controlling the conveyance of particulate material on a first conveyor belt, the first conveyor being driven by a driving means, the apparatus comprising:

a) a frame having at least one longitudinal member;

b) at least two rotating elements spaced apart along the frame; and, c) an endless belt extending around the rotating elements; the apparatus being positioned above and proximal to the first conveyor, wherein the endless belt extends along a portion of the first conveyor and wherein the particulate material flows between the endless belt and the first conveyor and whereby the endless belt is frictionally driven by the first conveyor belt.

BRIEF DESCRIPTION OF THE DRAWINGS

These and other features of the preferred embodiments of the invention will become more apparent in the following detailed description in which reference is made to the appended drawings wherein:

FIG. 2 is a side view of a safety apparatus in accordance with an embodiment of the invention FIG. 3 is a front view of the apparatus of FIG. 2

FIG. 4 is a detailed view of the apparatus of FIG. 2

FIG. 5 is a view on A—A of FIG. 4

DESCRIPTION OF THE PREFERRED EMBODIMENTS

Figure 1:
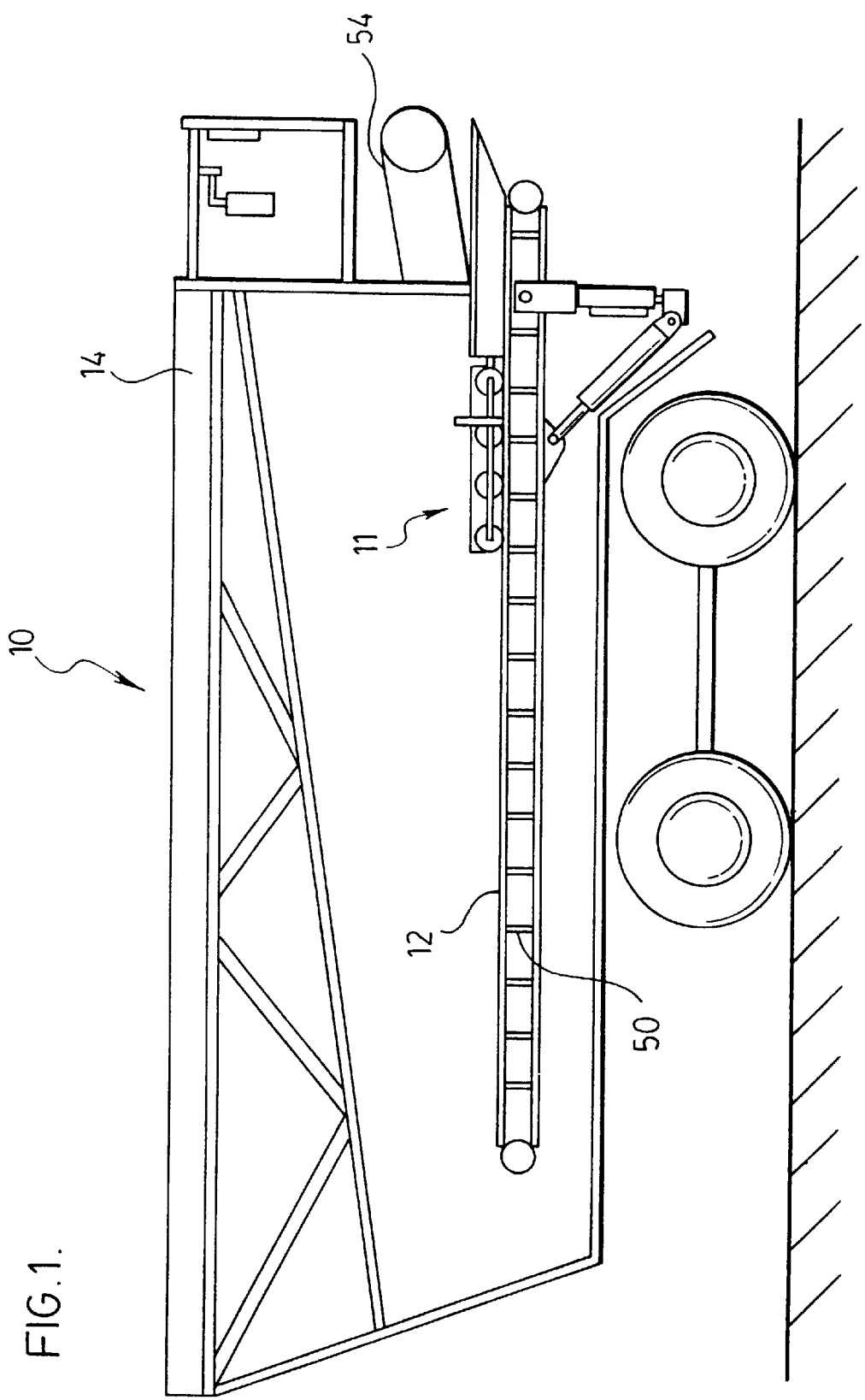
FIG. 1 shows a stone slinger truck in accordance with the prior art with a safety apparatus

Referring to FIG. 1, a prior art stone slinger truck is generally shown at 10. The truck includes an endless thrower belt 12, that is attached to the vehicle and is supported by a frame 50. The truck includes a drive means (not shown) to power the belt so as to move particulate material (not shown) deposited onto the belt from the truck bed 14 or from a hopper. Material may be deposited onto the belt directly from the truck bed 14 or an additional conveyor 54 may operate between the truck bed 14 and the belt 12 to transfer the material. The thrower belt 12 may be either smooth or ribbed.

Referring to FIG. 2, the apparatus of the invention is generally shown at 11. The apparatus includes an endless belt 16 located above the thrower belt 12 and adjacent to the outlet of the truck bed or hopper 14. In a preferred embodiment the endless belt 16 is approximately the same width as the thrower belt 12. In one embodiment, the endless belt 16 has ribs 30 located on the outer surface thereof and that run transverse to the direction of travel 32. The ribs 30 assist in frictionally engaging the endless belt 16 and the thrower belt 12. When the thrower belt 12 is in motion it drives the endless belt 16 as a result of the frictional engagement between the belts 12 and 16. In another embodiment, the endless belt 16 may be smooth while still maintaining the frictional engagement with the thrower belt 12. The frictional engagement may result from direct contact between the belts 12 and 16 or indirect contact, where the particulate material that is passing between the belts 12 and 16 transfers the motion from the thrower belt 12 to the endless belt 16.

The endless belt 16 extends around at least two pairs of wheels 22 rotatably attached to axles 24 mounted on opposite ends of a frame 54 which preferably comprises two longitudinal frame rails 20 extending along the length of endless belt 16. In a preferred embodiment, the apparatus of the invention includes a plurality of pairs of wheels 22 positioned along the length of the belt 16 so as to provide adequate support therefor. The number of additional wheels 22 and axles 24 between the ends of the endless belt 16 will vary depending on the size of the endless belt 16. In another embodiment, the wheels may be replaced with rollers. In yet another embodiment, the frame rails 20 may be replaced by a single longitudinal frame rail 20.

In a preferred embodiment, the endless belt 16 includes two rows of inner knobs 26 provided on the inner surface of the belt and along the length thereof. The knobs 26 are arranged so as to form two channels running longitudinally along the belt thereby providing a groove for the wheels 22. The channels formed by the knobs 26 thereby serve to maintain the belt in alignment with the wheels. It will be appreciated that various other arrangements are possible for maintaining the belt 16 in the desired alignment.

In a further preferred embodiment, the apparatus of the invention, 11, is kept from moving in the direction of travel 32 by a pivoting linkage 28. The linkage can be attached to any stationary part of the slinger such as the frame 50. The other end of the linkage 28 is attached to the side rails 20. It will be apparent that any other attachment means may be used.

In a further preferred embodiment, a support 19 may be detachably fixed to the frame 50. The support is U-shaped and extends across the top of the apparatus 11 and attaches to the frame 50 on both sides. In a preferred embodiment, depth stops, or ledges, 52 are located on either side of the support 19 adjacent to the frame rails 20. The depth stops 52 are provided for supporting the apparatus 11 of the invention so that the full weight of the apparatus is prevented from resting on the thrower belt 12. In addition, the support 19 restricts the vertical movement of the apparatus 11 so that it can only deflect a predetermined distance. In another embodiment, the depth stops may be omitted thereby allowing the thrower belt 12 to support the full weight of the apparatus 11; however, such an arrangement may lead to excessive wear or contortion of the belt 16 of the conveyor apparatus 11. This problem may be averted by reinforcing the belt 16 to prevent bending thereof.

In a further preferred embodiment, a shield 18 is located on top of the belt 16. The rear end of the shield 18 is adjacent to the hopper 14 and the forward end of the shield 18 may overhang the belt 16 by several inches to control any kickback of material. The shield 18 is attached to the frame rails 20. The shield 18 may have side guards 17 as shown in FIG. 3, and which have been omitted from FIG. 2 for clarity.

Referring to FIGS. 4 and 5, the pivoting linkage 28 is comprised of one link 38, which is attached to the conveyor assembly 11 at ball joints 44 and 46. Ball joint 44 is attached to the frame rail 24 and ball joint 46 is attached to the arch frame 19. The joints are in the same horizontal plane, although this is not necessary. The link 38 can rotate freely about both joints 44 and 46.

Now that the apparatus has been described, the mode of operation of the device will now be described.

The thrower belt 12 is set in motion by the driving means of the truck. Particulate material is released onto the thrower belt 12. The material is carried along the thrower belt 12 and underneath the endless belt 16.

The thrower belt 12 frictionally engages the outer ribs 30 of the endless belt 16 so that material passes between the two belts. In the preferred embodiment, the frame rails 20 keep the axles 24 aligned and the inner knobs 26 on the belt 16 keep it located with respect to the wheels 22. This configuration acts to keep the belt 16 in line with the thrower belt 12 as material passes under it.

As the material is passed between the two belts it is forced to settle on the thrower belt 12 instead of bouncing around, as it would normally do. The shield 18 that is located on top of the belt 16 may overhang the conveyor slightly. Although this is not essential, it is useful in order to deflect any material that may be stuck in the belt 16 and carried partway around before flying off. The shield 18 also ensures that any stones that are carried the entire way around stay on the belt 16.

The conveyor assembly 11 is equipped with a pivoting linkage 28 that allows temporary raising of the assembly 11 when large material passes between the belts 12 and 16. The pivoting linkage 28 is attached to a stationary part of the slinger such as the frame 50, in one embodiment, and the frame rails 20. The maximum vertical deflection of the conveyor assembly 11 is controlled by the support 19, which the conveyor assembly 11 cannot deflect beyond. The ability of the belt 16 to deflect vertically is useful when large particulate material is encountered.

It will be apparent to those skilled in the art that the apparatus of the invention can be utilized with any conveyor and with a variety of material. For example, particulate material may include sand, gravel, salt, rock etc. The conveyor may be associated with trucks (as described above) or with mining, equipment, farming equipment etc.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. An apparatus for controlling the conveyance of particulate material on a first conveyor belt, said first conveyor belt having a first engagement means and being driven by an independent driving means, said apparatus comprising:

a) a frame having at least one longitudinal member;

b) at least two rotating elements spaced apart along said frame; and c) an endless belt extending around said rotating elements and where said endless belt includes a second engagement means;

said apparatus being positioned above and proximal to said first conveyor, wherein said endless belt extends along a portion of said first conveyor and wherein said particulate material flows between said endless belt and said first conveyor;

said first engagement means of said first conveyor engages said second engagement means of said endless belt; and whereby said endless belt is frictionally driven by said first conveyor belt.

2. The apparatus of claim 1 further including a panel located above said endless belt for preventing particulate material attached to said belt from being discharged.

3. The apparatus of claim 1, wherein said first and second engagement means comprises a plurality of outwardly extending ribs.

4. The apparatus of claim 1 wherein said apparatus rests freely on said first conveyor.

5. The apparatus of claim 4 wherein said apparatus is pivotally connected with respect to said first conveyor belt vertical spacing between said apparatus and said first conveyor belt is dynamically variable.

6. The apparatus of claim 1 wherein said rotating elements comprise pairs of wheels on axles mounted.

7. The apparatus of claim 6 wherein said endless belt includes a pair of channels on an inner surface thereof, said channels being adapted to receive said wheels and to maintain alignment of said endless belt on said wheels.

\* \* \* \* \*